United States Patent Office
2,780,115
Patented Feb. 5, 1957

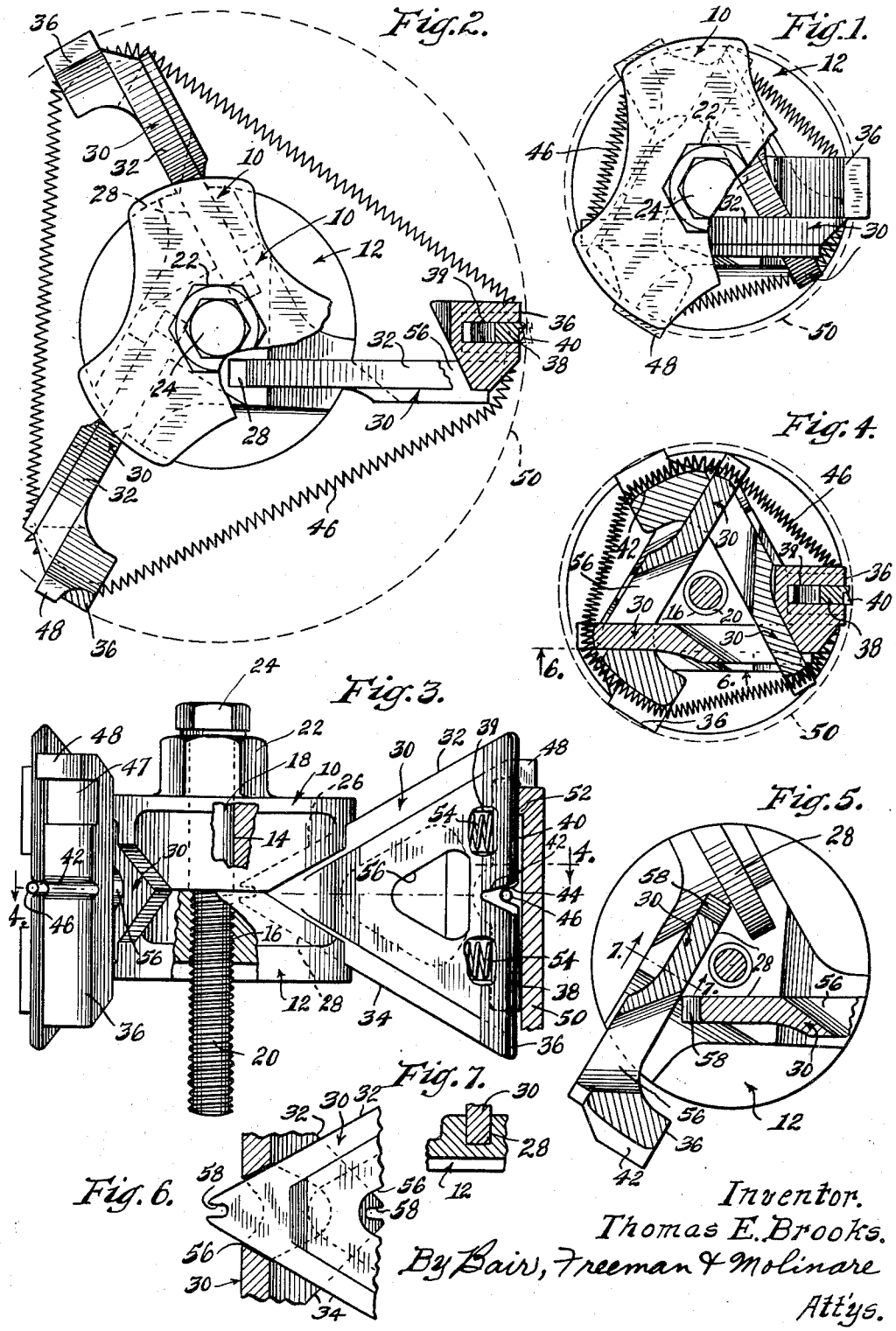

2,780,115

ADJUSTABLE CARRIER DEVICE

Thomas E. Brooks, Clarinda, Iowa, assignor to Lisle Corporation, Clarinda, Iowa, a corporation of Iowa Application September 20, 1952, Serial No. 310,680

2 Claims. (Cl. 77—2)

This invention relates to a supporting device for guide elements and/or work-contacting tool carriers such as used in a ridge reamer of the type shown in the Olson Patent No. 1,927,594 or in similar devices.

One object of the present invention is to provide an adjustable supporting device for such guide elements or tool carriers, the arrangement being such that the elements or carriers are adjustable for different operating diameters of the tool. The cylinder ridge reamer shown in the Olson patent is adjustable as to diameter in order to fit a range of cylinders of internal combustion engines or the like after which the tool is rotated in the cylinder and a cutting blade of the tool cuts off the ridge and brings it up to the same diameter as the rest of the cylinder. My present supporting device, however, is not limited to ridge reamers but may be used in connection with other tools such as glaze breakers and cylinder hones.

Another object is to provide an adjustable supporting device in which the carrier members of the tool may be adjusted to increase and decrease the operating diameter of the tool and wherein the parts are so constructed that a relatively great range may be covered, that is, the parts can be expanded for a relatively large diameter yet can also collapse to a relatively small diameter within its range of adjustment, the carrier members being radially slidable but offset with respect to the center so that they bypass the center rather than meeting at the center as in the Olson patent, and after bypassing the center, the inner end of one carrier element may enter a recess in an adjacent carrier member to permit adjustment to a minimum size wherein the carrier members are in overlapped position, yet when the tool is in the expanded position, adequate support is provided for the carrier members with respect to body members which carry and support them.

More specifically, an object of the present invention is to provide in that type of tool that can be radially adjusted for size, a body member arrangement and carrier members guided therein for adjustment purposes, which carrier members engage the work for guiding and/or cutting purposes and the like, the carrier members being triangular-shaped and so arranged that the inner smaller end of one may enter an opening in the next one when the parts are in the collapsed position for permitting adjustment to a minimum size without interference of one carrier member with another.

With these and other objects in view, my invention consists in the construction, arrangement and combination of the various parts of my adjustable carrier device, whereby the objects contemplated are attained, as hereinafter more fully set forth, pointed out in my claims and illustrated in the accompanying drawings, wherein:

Figure 1 is a plan view with parts broken away showing my adjustable supporting device adjusted for a minimum operating size, or diameter.

Figure 2 is a similar view showing it adjusted for the maximum possible diameter.

Figure 3 is a side elevation of Figure 2 with parts broken away and other parts shown in section to illustrate details.

Figure 4 is a horizontal sectional view on the line 4—4 of Figure 3 (showing the tool adjusted to the minimum size however, the same as in Figure 1).

Figure 5 is a view somewhat similar to Figure 4 with parts omitted and showing an intermediate adjustment.

Figure 6 is a detail sectional view on the line 6—6 of Figure 4; and

Figure 7 is a fragmentary sectional view on the line 7—7 of Figure 5.

On the accompanying drawing I have used the reference numeral 10 to indicate in general an upper body member and 12 a lower body member. The upper body member as shown in Figure 2 is in the shape of a three-arm spider having an upstanding boss 22 at its center; whereas the outline of the lower member 12 is circular. The body member 10 has a bore 14 therein and the body member 12 is provided with a corresponding bore threaded as indicated at 16. An adjusting screw having a shank 18 and threads 20 passes through the boss 22 and the bore 14, and is threaded into the bore 16. A head 24 on the adjusting screw 18—20 may be engaged by a wrench for rotating the adjusting screw as from the position shown in Figure 3 to one wherein the lower end of 20 is about even with the bottom of the member 12 whereupon the tool is adjusted for minimum size as in Figure 1 as distinguished from maximum size as in Figure 3.

The upper body member 10 is provided with three guide grooves 26 and the lower body member 12 is provided with three companion guide grooves 28 which are channel-shaped as shown in Figure 7. They are also inclined as evident from an inspection of Figure 3. A carrier member 30 is provided for each set of grooves 26 and 28 and has upper and lower edges 32 and 34 slidable in the respective grooves. The members 30 carry work contacting faces 36 to engage the internal surfaces of a cylinder or the like. Each carrier member 30 is provided with a notch 42 and one of them is provided with a vertical slot 39 in which is received a tool 38.

The tool 38 has a cutting blade portion 40 and a notch 44. A coil spring 46 surrounds the tool and is located in the three notches 42 and the notch 44 as illustrated particularly in Figures 2 and 4. This spring tends to keep the carrier members 30 biased toward the center of the tool and to retain them in the guide slots or grooves 26 and 28 of the body members 10 and 12. It also moves the carrier members 30 inwardly when the adjusting screw 18—20 is backed off from the position shown in Figure 3.

Each of the carrier members 30 is provided with a supporting lug 48 adapted to contact the upper end of an engine cylinder 50 as shown in Figure 3, when the tool is used as a ridge reamer for a ridge 52 thereof. When used in this manner, suitable power means or a wrench is applied to the hub 22 (which may be hexagon shaped for this purpose) for rotating the tool clockwise in Figure 2 so that the cutting blade 40 may cut off the ridge 52 of the cylinder wall until this portion of the cylinder is coincident with the rest of the cylinder wall against which the tool 38 is held by a pair of springs 54. These springs also permit the tool to follow an out-of-round cylinder.

The preferable adjustment for the adjusting screw 18—20 is one in which the tool is expanded with the work contacting faces 36 of the two left-hand carriers 30 in contact with the cylinder wall 50 (indicated by dash lines in Figure 2) and the corresponding face of the tool carrying member 30 (which projects toward the right) slightly spaced from the cylinder wall. The initial position of the blade or tool 38 is as shown by dotted lines in Figure 2 and therefore in the solid line position shown, the springs 54 are compressed to cause the cutter 40 to work its way through the ridge 52 and stop cutting when the ridge has been trimmed down level with the wall of the cylinder 50 due to the tool 38 at that time contacting the wall throughout the height of the tool instead of being at a slight angle thereto as at the start of the ridge reaming operation depicted in Figure 3.

When the tool is adjusted as in Figure 2 and even when adjusted down to the size of Figure 5, there is no interference between the carrier members 30. However, at positions of adjustment less than the diameter shown in Figure 5, the inner end of one member 30 would strike the next one, and I have therefore provided a recess or opening 56 in each blade to receive the inner end of the next adjacent carrier member. Such reception is at maximum in the adjustments shown in Figures 1 and 4.

The triangular shape of each carrier member 30 permits the overlapping arrangement shown in Figure 4 and to provide maximum stock in each of the members 30, the recesses 56 are triangular in shape and their side edges are inclined at a suitable angle to just permit clearance of the inner end of one member in the opening of the other one as they are collapsed from the position of Figure 5 to the position of Figure 4. In the final position (Figure 4), it will be noted that the inner end of one carrier member has engaged the outer surface of the recess 56 of the next one, thus limiting the movement. Also in this position, a notch 58 in the inner end of the carrier member 30 straddles the spring 46 so as not to interfere with it.

While I have shown two of the carrier members 30 merely as guide elements and the third one as a tool carrier, all three may be guide elements and used for any suitable purpose where a supporting means is adapted for adjustment to fit cylinders or the like of different diameters. On the other hand, all three may be guide elements for rotation or stationary location in a cylinder with a tool carried elsewhere by the carrier device. In all instances the construction is such that a maximum range of diameters as illustrated by comparing Figure 1 with Figure 2 may be accommodated by the single device disclosed. Without this wide range of adjustment it would otherwise be necessary to provide at least two sizes of tools.

Some changes may be made in the construction and arrangement of the parts of my adjustable carrier device without departing from the real spirit and purpose of my invention, and it is my intention to cover by my claims any modified forms of structure or use of mechanical equivalents which may be reasonably included within their scope.

I claim as my invention:

1. An improvement in adjustable carrier members used in adjustable tools having several carrier members comprising a body member, a carrier member having work contacting means, said body member being provided with guide means spaced to one side of the diametrical center of said body member, means for adjusting said carrier member relative to said body member, said carrier member having a reduced inner end and a recess therein between the side edges thereof to allow the reduced inner end of an adjacent carrier member to enter said first carrier member between said side edges for the purpose of increasing the effective size range of said adjustable tool by permitting minimum size when said reduced inner ends of said carrier members are entered to a maximum possible depth in said recesses and by permitting maximum size by having said reduced inner end of said carrier member substantially engaged in and supported by said guide means of said body member when said carrier members are adjusted outwardly.

2. An improvement in adjustable carrier members used in adjustable tools having several carrier members comprising a body member, a carrier member having work contacting means, said body member being provided with guide means spaced to one side of the diametrical center of said body member and coacting with opposite side edges of said carrier member, means for adjusting said carrier member relative to said body member, said carrier member having a space therein between said side edges for the purpose of receiving a portion of an adjacent carrier member when said carrier members are adjusted to the smaller sizes of tool diameter, said guide means receiving the portions of said side edges inwardly beyond said space when said carrier members are adjusted to the larger sizes of tool diameter.

References Cited in the file of this patent

UNITED STATES PATENTS

| | | |
|---|---|---|
| 914,370 | Gibbins | Mar. 2, 1909 |
| 1,008,544 | Hoyt | Nov. 14, 1911 |
| 1,927,594 | Olson | Sept. 19, 1933 |
| 2,638,799 | Billeter | May 19, 1953 |